Nov. 30, 1948.
C. R. MASON
2,454,973
POLARIZED ELECTROMAGNETIC CONTROL DEVICE
Filed Dec. 1, 1944
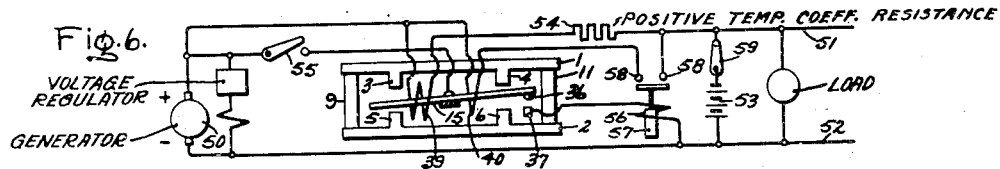
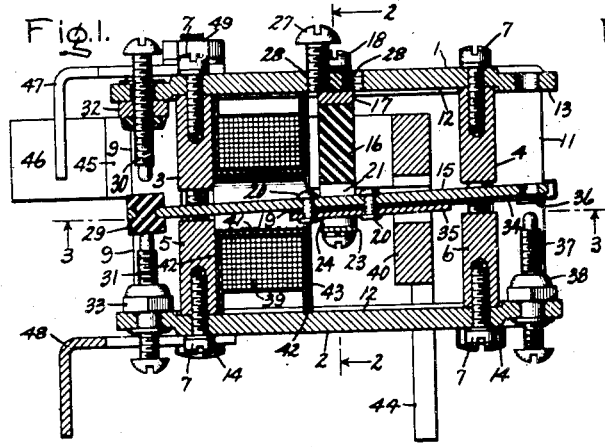
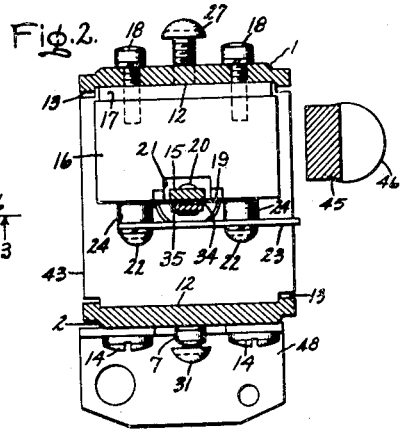
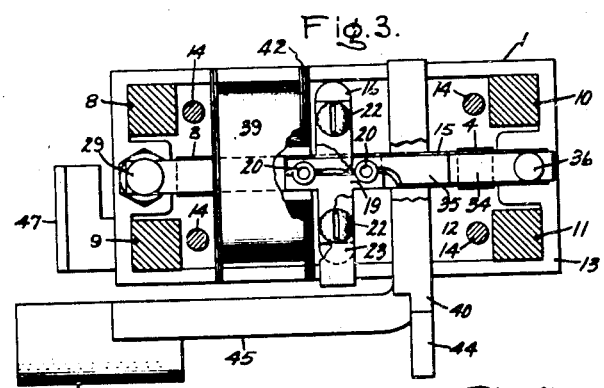
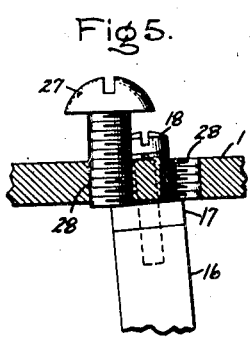
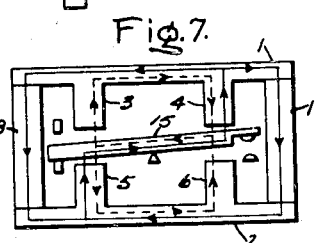
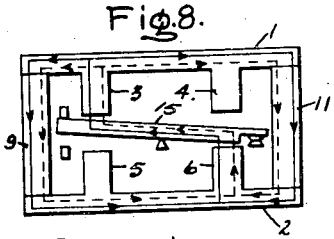
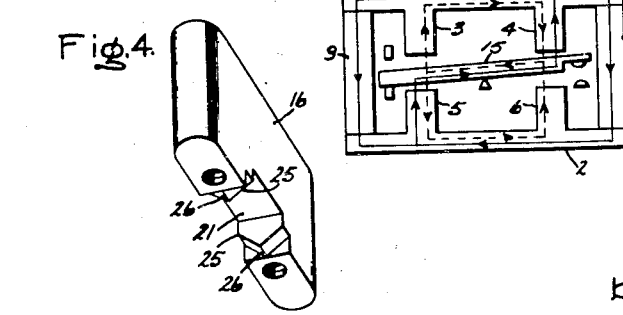
Inventor:
Charles R. Mason,
by Harry E. Dunham
His Attorney.

Patented Nov. 30, 1948

2,454,973

UNITED STATES PATENT OFFICE 2,454,973

POLARIZED ELECTROMAGNETIC CONTROL DEVICE

Charles R. Mason, Ballston Spa, N. Y., assignor to General Electric Company, a corporation of New York Application December 1, 1944, Serial No. 566,061

4 Claims. (Cl. 175—339)

My invention relates to improvements in electromagnets and more particularly to polarized electromagnets for direct current energized control devices such as relays and the like.

In the control of the switching of direct current generators on multi-engine aircraft, many problems arise in consequence of the parallel operation of the generators. Under light loads such as occur in ordinary flying, there is a tendency to interchange of currents since relatively small differences in regulated voltage produce large interchange of current due to the low resistance of the circuit. In consequence of this, particularly if one generator is started and switched over at something less than full voltage while other generators on the same bus are operating at full voltage, the usual reverse current cutout devices employed operate so frequently as quickly to shorten their useful life. Such frequent operation because of its rapidity is known to the art as "chatter." In order to avoid these difficulties, it has been found desirable to replace the usual reverse current cutout device by a differential device which responds to the difference between the generator voltage and the system voltage to connect the generator to the system only when the generator voltage exceeds the system voltage by a small amount. With such differential devices, chatter is eliminated. Also shock and the limitations imposed by space and weight factors have to be given careful consideration. In order to be satisfactory, such differential devices require a high sensitivity of response and relatively large contact movement, which in turn means a relatively large armature movement. Moreover, since relatively large operating forces are needed, it is necessary to utilize for operating windings as much as possible of the limited space available. Furthermore, it is necessary to minimize the weight of all the parts and so to balance the movable parts as to reduce the susceptibility to false operation by shock.

An object of my invention is to provide an improved direct current electromagnet which is particularly adapted for the differential control of the paralleling of direct current generators. Another object of my invention is to provide an improved highly sensitive electromagnetic control device which is compact, light in weight, and substantially free from false operation under shocks and vibrations. Still another object of my invention is to provide an improved highly sensitive permanent magnet polarized direct current electromagnetic device, the armature of which is arranged to have a relatively large movement without touching its cooperating pole pieces. A further object of my invention is to provide an improved permanent magnet polarized direct current electromagnetic device, the armature of which is arranged to function as a part of the movable circuit controlling member. These and other objects of my invention will appear in more detail hereinafter.

In accordance with my invention, I provide a direct current electromagnet in which two magnetic members, each provided with two spaced pole pieces, are positioned with their pole pieces opposed and spaced to provide air gaps by a plurality of permanent magnets which present like poles of one polarity to one of the magnetic members and like poles of opposite polarity to the other member. Also in accordance with my invention, I provide a resilient pivotal support between the magnetic members intermediately of the two pairs of opposed pole pieces for an armature of magnetic material having its ends movable in unstable magnetic attractive relation from a neutral position in the gaps between the pole pieces toward each pair of diagonally opposite pole pieces so as to partially neutralize the reversely unbalanced torque effect produced by the permanent magnets on the armature and thereby obtain increased sensitivity in the electromagnetic operation of the armature. Further in accordance with my invention, I provide operating winding means around the armature and between the members for effecting movement of the armature towards each pair of diagonally opposite pole pieces in dependence on the direction of current flow in the winding means.

My invention will be better understood from the following description when considered in connection with the accompanying sheet of drawings, and its scope will be pointed out in the appended claims.

In the accompanying sheet of drawings, Fig. 1 is a longitudinal cross sectional view of an electromagnet embodying my invention; Fig. 2 is an elevation, partly in section, on the line 2—2 of Fig. 1 looking in the direction indicated by the arrows; Fig. 3 is a plan view, partly in section, on the line 3—3 of Fig. 1 looking in the direction indicated by the arrows; Fig. 4 is a perspective view of the armature fulcrum support shown in Figs. 1–3; Fig. 5 is a detail illustrating an adjustable mounting for the fulcrum support shown in Fig. 4; Fig. 6 is a circuit diagram of a direct current generator control system using a differential relay embodying my invention; and Figs. 7 and 8 are schematic views explanatory of the operation of my invention.

In the accompanying drawing, I have illustrated an embodiment of my invention in a direct current polarized relay comprising two magnetic members 1 and 2 respectively provided with two spaced magnetic pole pieces 3, 4 and 5, 6 extending from one side of the respectively associated member. These pole pieces may be integral with their respectively associated members but, as shown, are separate magnetic elements secured to the respectively associated members 1 and 2 by suitable fastening means such as screws 7. The members 1 and 2 are positioned with their respective pole pieces opposed and spaced to provide suitable air gaps by a plurality of bar-type permanent magnets 8, 9, 10 and 11 mounted between the members to present like poles of one polarity to one of the members and like poles of opposite polarity to the other of the members.

In order to obtain the desired intensity of permanent magnet flux with minimum weight and space, I prefer to use permanent magnets of the alloy type such, for example, as Alnico. Because of the difficulty of performing certain machining operations on such magnetic alloys, I provide a relatively simple arrangement which requires only that the ends of the permanent magnets 8, 9, 10 and 11 be ground substantially flat, an operation which is readily practical on such magnetic alloys. Thus, as shown, for such an arrangement, I preferably make the members 1 and 2 in the form of substantially rectangular plates which are stamped to provide a central portion 12, having a raised outer rim 13, the corners of which serve to retain the permanent magnets in their respective positions when the members 1 and 2 are held together by suitable means such as clamping screws 14.

In accordance with my invention, an armature 15, preferably of low retentivity magnetic material, is pivotally supported between the magnetic members 1 and 2 intermediately of the two pairs of opposed pole pieces 3, 5 and 4, 6 with its end portions movable in the air gaps between the pole pieces toward diagonally opposite pole pieces. In order to have the armature 15 available as a movable circuit controlling member and a live part of the circuit controlled by the armature in its movement and further to insure a simple, rugged and readily adjustable mounting, I provide an insulated torsion spring type of mounting. As shown, this mounting comprises an insulating support 16 which is secured to the lower side of the plate 1 preferably with an intervening metallic bearing element 17 by suitable means such as screws 18.

For pivotally supporting the armature 15 on the support 16, I provide, as shown in the illustrated embodiment of my invention, a flat spring 19 in the form of a cross, one arm of which extends lengthwise of the armature 15 and is secured thereto by suitable means such as rivets 20. The other arm of the spring 19 extends transversely of the armature 15 across a fulcruming notch 21 in the support 16 and is firmly secured thereto by suitable means such as screws 22 extending through a terminal member 23 and spacers 24. In order to obtain the nearest to a line pivotal action with the spring 19, the sides 25 of the notch 21 are cut back to a V-shape to provide line bearing edges 26, as shown more clearly in Fig. 4. In order to adjust the no-stressed, that is, no-torsion, position of the spring 19 to the neutral position of the armature 15, I provide suitable adjusting means such as a canting screw 27 positioned in the plate 1 eccentric to the center line of the support 16 in one or the other of the holes 28 in the magnetic plate 1 but so bearing on the support plate 17 that, by loosening the screws 18, the armature support 16 can be canted to the right or left, as shown more clearly in Fig. 5.

In order to prevent the armature 15 from coming into magnetic and conducting contact with the pole pieces 3, 4, 5 and 6, I provide the left-hand end of the armature with an insulating element 29 which may be molded in place as indicated. This insulating element 29 is movable between two adjustably positioned stops such as screws 30 and 31 respectively mounted in self-locking nuts 32 and 33 which are respectively secured to the magnetic plates 1 and 2. For current conducting purposes, the armature 15 is provided with a leaf spring contact arm 34 which is secured to the armature between a backing member 35 and the biasing spring 19 by the rivets 20. The contact arm 34 carries a suitable contact such as a button 36 of palladium which does not readily develop metallic salts of high resistance. Also, the contact arm 34 is looped over the end of the armature, as shown, for limited wiping movement relatively to the armature. Cooperating with the movable contact 36 is a stationary contact 37 which, for purposes of adjustment, may be a palladium-tipped screw adjustably positioned in a self-locking nut 38 secured to the magnetic plate 2.

For actuating the armature 15 in dependence on predetermined conditions of a direct current circuit, I provide actuating means such as one or more energizing windings 39 and 40 around the armature and between the magnetic plates 1 and 2 for controlling the movement of the armature in dependence on the direction of current flow in the winding and the position of the armature relatively to diagonally opposite pole pieces 3, 6 and 4, 5. As shown, the winding 39 is a relatively high resistance winding of many turns. This winding 39 may be termed a differential coil. As shown, the winding 40 is a low resistance single turn winding which may be termed a series coil. It will be apparent that because of the arrangement of parts there is sufficient winding space on opposite sides of the armature pivotal support and between the plates 1 and 2 for these windings 39 and 40. For simplicity in mounting, the winding 39 is wound on a spool 41 of insulating material. This spool is positioned between metallic side plates 42 which are shaped to fit the transverse contour of the plates 1 and 2 so as to be locked in position when the clamping screws 14 are tightened. An insulating plate 43 is positioned between the armature pivotal support and the right-hand plate 42 to prevent any possibility of shortening the armature to the plate 42. The winding 40 is provided with heavy current capacity leads 44 and 45 which may be secured to the relay base, not shown. Also, the terminal 45 may have an enlarged rounded end 46 for a terminal connection. For mounting the electromagnet on a suitable base, I provide means such as brackets 47 and 48 respectively secured to the magnetic plates 1 and 2 by the left-hand clamping screws 14, one of which is provided with a nut 49 for this purpose.

The operation of devices embodying my invention will be better understood from a consideration of the schematic illustrations shown in Figs. 7 and 8. First, it will be assumed that the permanent magnets 8, 9, 10 and 11 present north poles to the magnetic plate 2 and south poles to the magnetic plate 1. In Fig. 7, it will be assumed that the armature 15 is positioned as shown in Fig. 1 and neither of the windings 39 and 40 is energized. Under these conditions, the major portion of the flow of flux due to the permanent magnets is as indicated by the arrows on the solid lines. Under these conditions, it will be obvious that the flux due to the permanent magnets tends to hold the armature in the contact open position. If now the winding 39 is energized by a current flowing in a direction to produce in the armature a flux flowing in the direction indicated by the arrows on the dotted lines, that is, opposed to the permanent magnet flux flowing in the armature, then the bucking effect of the flux produced by the winding 39 will, if great enough, so decrease the attractions at the diagonally opposite poles 4 and 5 and so increase the attractions at the diagonally opposite poles 3 and 6 as to effect clockwise movement of the armature to the position shown in Fig. 8. By this movement of the armature, it will be observed that the solid line flux due to the permanent magnets reverses its direction of flow through the armature to act cumulatively with the armature flux caused by the winding 39, thus maintaining the armature in the closed circuit position.

Assuming the armature 15 in the position shown in Fig. 8 and that flux in the armature due to the winding 40 is also in the direction indicated by the arrows on the broken lines in Fig. 8, then the armature 15 tends to remain in the closed circuit position shown in Fig. 8. If, however, current should reverse in the winding 40 so as to reverse the direction of flow of broken line flux in the armature, then, if this flux is great enough, it will result in moving the armature from its position adjacent the poles 3 and 6 to its position adjacent the poles 4 and 5 shown in Fig. 1.

If, in either position of the armature with its ends adjacent diagonally opposite pole pieces, the windings 39 and 40 are deenergized, no change in position of the armature will occur because the permanent magnet flux will hold the armature. In other words, the relative torque effects of the spring 19 and the permanent magnets 8, 9, 10 and 11 are such as to retain the armature 15 in position adjacent that pair of diagonally opposite pole pieces to which it was last moved when the windings are deenergized. In this connection, it is to be noted that the biasing effect of the armature mounting spring 19 is a neutralizing force tending to decrease the effective attractive effort of the permanent magnets at substantially the same rate of variation as the attractive effort in order to obtain maximum sensitivity. For this purpose, the no-stressed position of the spring 19 should be adjusted to correspond as nearly as possible to the neutral position of the armature 15 relatively to the opposed pole pieces.

In the application of my invention shown in Fig. 6, a direct current generator 50 is to be connected to load buses 51 and 52 only when the generator voltage exceeds the bus voltage sufficiently to supply some current to the load which is indicated in part as a storage battery 53. The differential winding 39 of the device shown in Figs. 1, 2 and 3 is connected in series between the generator positive terminal and the bus 51 through a ballast resistance 54 which is preferably a non-linearly variable positive temperature coefficient resistance such, for example, as a tungsten lamp having a cold resistance substantially equal to the resistance of the differential coil 39. When the voltage across the winding 39 is in the right direction and sufficient to insure that the generator voltage is high enough to supply current to the load, then the armature 15 is moved to the closed circuit position as described in connection with Figs. 7 and 8. Under these conditions and assuming that the manual starting switch 55 is closed, the circuit of the energizing winding 56 of a contactor 57 will be completed across the generator 50 through the contacts 36 and 37 of the differential device embodying my invention, whereupon the contactor 57 is operated to close its contacts 58 and by-pass the winding 39 and the resistance 54 through the series coil 40. As long as current flows in this series coil 40 from the generator 50 to the bus 51, the armature 15 will be retained in the closed circuit position. If for any reason, such as a fault in the generator 50 or a reduction in its voltage below a predetermined value, current flow is reversed in the series coil 40, the armature 15 will be quickly returned to its initial or circuit open position in the manner explained in connection with Figs. 7 and 8. When the armature is returned to its initial position, the circuit of the energizing winding of the contactor 57 is interrupted at the contacts 36 and 37 to drop out the contactor and thereby to restore the differential winding 39 and the resistance 54 as a by-pass around the open contacts of the contactor 57. With the opening of the contactor contacts 58, the generator is effectively taken off the load bus 51, 52 as far as supplying load is concerned.

It will be observed that if the battery switch 59 were closed by the operator in charge of the system while the engine which drives the generator 50 is idle, full battery voltage would be applied to the differential coil 39 if it were not for the resistance 54 because of the low resistance of the idle generator. A worse condition could happen if the engine were started and the generator built up in the wrong direction because there would then be the sum of the generator and battery voltages applied across the differential coil circuit. This would be about twice normal voltage and without the resistance 54 would be dangerous for the differential winding 39. If the generator voltage regulator were to fail while the generator is being driven, approximately twice generator voltage plus bus voltage would occur across the differential coil because without voltage regulation the generator maximum voltage is about twice its normal voltage. It will therefore be apparent that the function of the ballast resistor 54 is to protect the differential winding 39 under abnormal voltage conditions so as not to interfere with the proper operation of the differential relay device. It will be apparent from the foregoing that, with devices embodying my invention, repeated closing and opening of the contacts 36 and 37 when one generator, such as 50, is started while others, not shown, on the same bus 51, 52 are operating on full voltage is prevented. Moreover, the starting generator is switched onto the bus only when its voltage is just sufficient to supply current to the bus.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. A direct current electromagnet comprising two relatively thin substantially similar rectangular members each having two spaced pole pieces extending substantially perpendicularly from one face of the member near the ends thereof, means positioning said members substantially parallel with their respective pole pieces opposed and spaced to provide two predetermined air gaps comprising four bar-type permanent magnets mounted between said members adjacent the corners thereof to present like poles of one polarity to one of said members and like poles of opposite polarity to the other of said members, an armature of low retentivity magnetic material, means pivotally supporting said armature with its ends movable in the air gaps between said opposed pole pieces toward diagonally opposite pole pieces comprising a notched support secured to one of said members intermediate the pole pieces thereof and projecting in the same direction as the pole pieces, torsion spring means bridging the notch in said support and secured to said armature, means for canting said support relatively to said one member whereby to vary the armature position in which said torsion spring means is unstressed, and energizing winding means around said armature and between said members for controlling the movement of the armature in dependence on the direction of current flow in the windings and the position of the armature relatively to diagonally opposite pole pieces.

2. A direct current electromagnet comprising two relatively thin substantially similar rectangular magnetic members each having two spaced pole pieces extending substantially perpendicularly from one face of the member near the ends thereof, means positioning said members substantially parallel with their respective pole pieces opposed and spaced to provide two air gaps comprising four bar-type permanent magnets mounted between said members adjacent the corners thereof to present like poles of one polarity to one of said members and like poles of opposite polarity to the other of said members, an armature of low retentivity magnetic material, means secured to one of said members intermediate the pole pieces thereof for resiliently pivotally supporting said armature between said members with its ends movable in the air gaps between said opposed pole pieces toward diagonally opposite pole pieces and tending to bias the armature to a predetermined position, two energizing windings around said armature respectively positioned on opposite sides of the pivotal support thereof for controlling the movement of the armature in dependence on the direction of current flow in the windings and the position of the armature relatively to diagonally opposite pole pieces, and means for clamping said permanent magnets and one of said windings between said members, the relative torque effects of said resilient supporting means and said pole pieces on the armature being so proportioned that the ends of the armature remain in position adjacent a pair of diagonally opposite pole pieces when said windings are deenergized.

3. A direct current electromagnet comprising two relatively thin substantially similar rectangular members each having two spaced pole pieces extending substantially perpendicularly from one face of the member near the ends thereof, means positioning said members substantially parallel with their respective pole pieces opposed and spaced to provide two air gaps comprising four bar-type permanent magnets mounted between said members adjacent the corners thereof to present like poles of one polarity to one of said members and like poles of opposite polarity to the other of said members, an armature of low retentivity magnetic material, means secured to one of said members intermediate the pole pieces thereof for resiliently pivotally supporting said armature between said members with its ends movable in the air gaps between said opposed pole pieces toward diagonally opposite pole pieces and tending to bias the armature to the neutral position, and energizing winding means around said armature and between said members for controlling the movement of the armature in dependence on the direction of current flow in the windings and the position of the armature relatively to diagonally opposite pole pieces the relative torque effects of said resilient means and said permanent magnets on said armature being proportioned to retain the armature in position adjacent a diagonally opposite pair of pole pieces when said winding means is deenergized.

4. A direct current electromagnet comprising two relatively thin substantially similar rectangular members each having two spaced pole pieces extending substantially perpendicularly from one face of the member near the ends thereof, means positioning said members substantially parallel with their respective pole pieces opposed and spaced to provide two predetermined air gaps comprising four bar-type permanent magnets mounted between said members adjacent the corners thereof to present like poles of one polarity to one of said members and like poles of opposite polarity to the other of said members, an armature of low retentivity magnetic material, means secured to one of said members intermediate the pole pieces thereof for resiliently pivotally supporting said armature between said members with its ends movable in the air gaps between said opposed pole pieces toward diagonally opposite pole pieces, means for canting said armature supporting means relatively to said one member whereby to vary the armature position in which the resilient support is substantially unstressed, and energizing winding means around said armature and between said members for controlling the movement of the armature in dependence on the direction of current flow in the windings and the position of the armature relatively to diagonally opposite pole pieces.

CHARLES R. MASON.

REFERENCES CITED

The following references are of record in the file of this patent:

UNITED STATES PATENTS

| Number | Name | Date |
| --- | --- | --- |
| 2,143,097 | Warnke | Jan. 10, 1939 |
| 2,267,808 | Blount | Dec. 30, 1941 |
| 2,380,293 | Carroll | July 10, 1945 |